April 13, 1943.  S. IWANOWICZ  2,316,589
LAMP OR ILLUMINATED ORNAMENT
Filed April 21, 1942
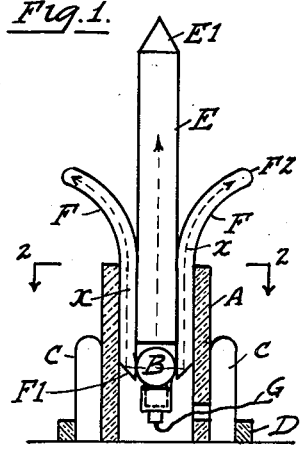
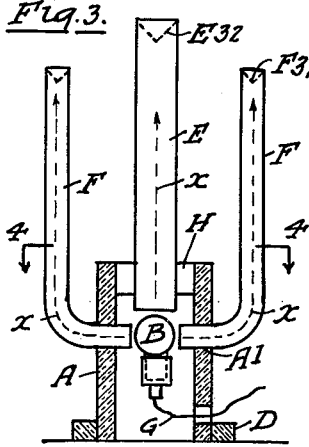
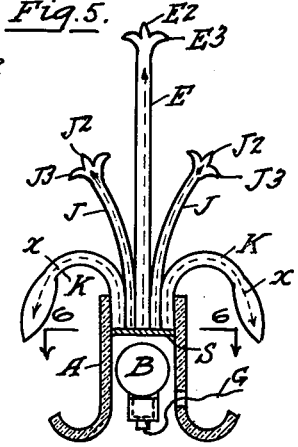
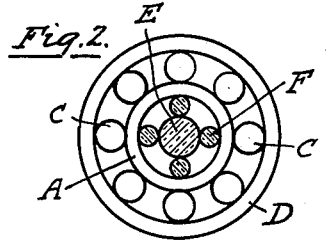
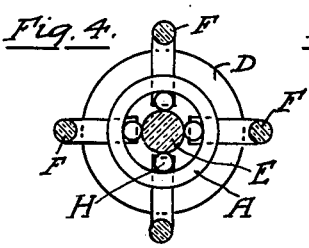
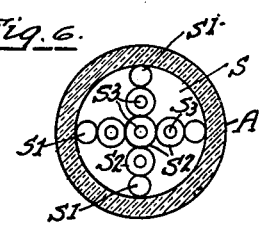
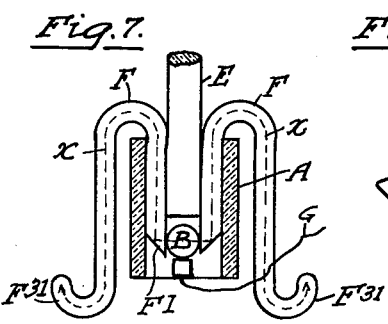
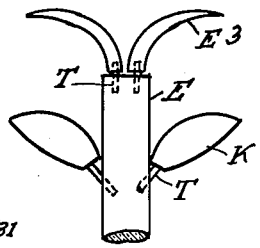
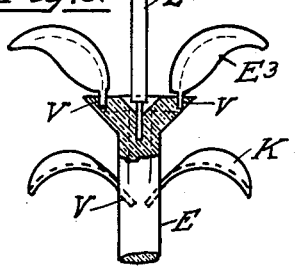
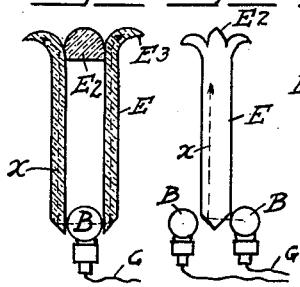
Inventor—
Stanley Iwanowicz.

Patented Apr. 13, 1943

2,316,589

UNITED STATES PATENT OFFICE 2,316,589

LAMP OR ILLUMINATED ORNAMENT

Stanley Iwanowicz, Detroit, Mich.

Application April 21, 1942, Serial No. 439,815

1 Claim. (Cl. 240—10)

My invention relates to lamps or illuminated ornaments, and its principal object is to provide an ornamental structure which may be formed as an artificial plant, flower, or other artistic object and combined with indirect illuminating means of relatively low candle power so as to serve an ornamental purpose only or, alternatively, with illumination of high intensity so as to light up a certain area surrounding it and so perform also the function of a lamp.

According to my said invention I form a hollow base preferably from transparent or translucent material which is adapted to contain within it one or more electric light bulbs, and around and above this base I build up a series of translucent or transparent rods or tubes, or a combination of rods or tubes, in the form of a plant, a group of flowers, or any other pleasing design, the elements of which are so arranged as to receive and transmit light from the bulb or bulbs aforesaid.

A further object of my said invention is to provide cheap and simple means whereby the various elements of the device may be made to show different colors, either contrasting or harmonious as desired, so as to produce still further resemblance to an actual plant, flower or other object.

With the above recited and other objects in view, I will now describe a variety of embodiments of my invention, illustrating the versatility of the basic principles involved, reference being had to the accompanying drawing, in which—

Figure 1 is a vertical section, taken on the center line, showing one form of my improved device, certain parts being shown in elevation.

Figure 2 is a plan view, taken in section on line 2—2 of Figure 1, showing the arrangement of the base members and the associated elements.

Figure 3 is a vertical section corresponding to Figure 1, showing a modified design.

Figure 4 is a plan view, taken in section on line 4—4 of Figure 3.

Figure 5 is a vertical section corresponding to Figure 1, showing a further modified design.

Figure 6 is a plan view, taken in section on line 6—6 of Figure 5, drawn to an enlarged scale.

Figure 7 is a vertical section showing a form of base in which certain of the light transmitting elements are used to support the device.

Figure 8 is a fragmentary elevational view, showing a method of attaching certain plant forms to a central or main stem.

Figure 9 is a similar view showing another method of accomplishing the same purpose.

Figure 10 is a fragmentary sectional view showing a tubular main stem combined with a single light bulb.

Figure 11 is a similar view showing a solid main stem combined with two light bulbs.

Figures 12, 13, 14, and 15 illustrate various ways of using a tubular main stem.

Like characters designate corresponding parts throughout the several views.

Referring more particularly to Figures 1 and 2 of the drawing, A is a cylindrical member around which are arranged a series of solid members C, held in contact with the member A by a ring D, the members A, C, and D having their lower terminals in alignment and being connected together by cementing or other means so as to form a solid and durable base for the device.

Within the member A, and in spaced relation thereto, is a central stem E, representing for example, a candle, and in the annular space between it and the interior surface of the member A are arranged a plurality of rods F, flared outwardly as shown in Figure 1. Below the stem E is a single light bulb B, supported by any suitable means not shown and provided with electrical current as by the wire or cable G.

It will be understood that on the bulb B being energized, the whole device, being of transparent or translucent material, will glow throughout the several members in a pleasing manner. It will be obvious however, that the central stem E will receive the greater part of the illumination while the members F will also be brighter than the balance of the members which form the base. The lower ends of the members F are bevelled as indicated at F1, whereby the light issuing laterally from the bulb is deflected along the lines $x$ and will follow around the upper curved portions as far as the extremities or tips F2. The latter effect is more pronounced when the members are formed of a plastic such as the well-known "Lucite" than when they are of glass. The bevelled surfaces F1 may be coated with a metallic or other mirror-like material well known in the art and the total effect may be further enhanced by applying various colors to the tips F2 and to the upper end E1 of the stem. Alternatively, the color may be applied at the lower ends of the elements E and F, either directly upon the material or through transparent colored screens.

In the modification shown in Figures 3 and 4 of the drawing the central stem E is supported within the base member A by fillers H, and the members F have their lower ends facing the bulb B and extend outwards through openings A1, where they are bent at right angles and extend upwards as shown in Figure 3, their upper ends as well as the upper end of the stem E having conical recesses F32, E32 therein, which recesses may be colored, as stated in regard to the design of Figure 1. Light from the bulb will follow the axes of the members F as indicated by the dotted lines x. The outer ring D is in this case cemented directly on to the member A.

In the modification shown in Figures 5 and 6 of the drawing the base member A is flared outward at its lower end to obtain stability without additional members. In this design the top of the central stem E is made to simulate a flower and two annular rows of stems J and K are arranged between the member E and the cylinder A, the stems J terminating in the same manner as the member E while the stems K take the form of leaves.

In this arrangement the members E, J and K terminate in a single plane at their lower ends, and between this plane and the bulb B is arranged a screen S of transparent material, various points on which are differently colored so as to impart corresponding colors to the stems. For example, as shown in Figure 6, there is an outer group of green spots S1 which come directly under the ends of the leaves K so that the light from the bulb passing through them transmits color through and up to the extremities of the leaves as indicated by the dotted line x. Beneath each of the members E and J are spots S2, the outer portions of which are colored red while the inner portions S3 are colored yellow, by which means the central portions E2 and J2 of the respective members receive the yellow rays and the outer portions or petals E3, J3 receive the red rays, giving a very artistic appearance to the whole. Obviously, instead of using the screen S, the colors may be applied directly to the ends of the various stems.

In the fragmentary view, Figure 7, is shown a modification of the base portion of the device wherein the members F shown in Figure 1 are bent downwards and then curved upwards at the bottom as at F31 to form a support. Many similar modifications of the design will easily occur to those skilled in the art.

In the fragmentary views, Figures 8 and 9 of the drawing are shown the upper extremities of the stem E of Figure 5. In Figure 8, petals E3 are shown attached to the top of the stem by means of wire dowels T and below them the leaves such as K are similarly attached to the lateral surfaces of the stem. In an alternative construction shown in Figure 9, the petals E3 are flattened at their ends as at V and fit in slots in the widened upper end of the stem, while in the center, the member E2, which may represent the pistil of a flower, is similarly attached as also are the leaves K.

Figures 10 to 15, inclusive, show fragmentarily the upper portions of different stems E. In Figure 10 the stem E has a tube having its lower edge bevelled, as shown, so as to receive light from the bulb B and deflect it upwards along the dotted line x. A central portion E2 is made separately and inserted into the end of the tube. Figure 12 shows a similar construction in which the member E2 extends downward through the whole length of the tubular member E. In Figure 11 is shown the application of two or more bubs B to illuminate the stem. The bulbs are placed in opposed relation as shown and the light is reflected upwards from the bevelled surfaces, as indicated by the dotted lines x. In Figure 13 the tubular stem E is provided at its upper end with a simulated flower which in this case is pressed separately from sheet plastic and held in position by cement or other means. In the fragmentary section, Figure 14, a tubular stem E is provided with an upper pointed terminal E1 which is fitted into the upper end of the tube, while in Figure 15 the central portion E11 extends downwardly throughout the length of the member E.

It will be observed from the foregoing description and by reference to the drawing that I have provided a useful and ornamental device which can be made in various forms within the scope of the general principles, and while I have herein described a few preferred embodiments of the invention, it will be obvious to those skilled in the art to which the same relates that various further modifications may be made to suit any particular or peculiar requirement without departing from the spirit of the invention as defined in the appended claim. For example, many combinations and arrangements of tubes and rods of various thicknesses can be used and these may be initially colored or have color applied to them in the manner hereinbefore described. The devices may be made of transparent or translucent glass or plastics and in such forms and combinations as to serve as table, radio and vanity lamps, candles, and in an infinite number of different floral and other designs, either to stand upon a surface as in the example shown, to be made as wall brackets, or to be suspended after the manner of a chandelier.

Having thus described my said invention, what I claim and desire to secure by Letters Patent of the United States is:

An ornamental light comprising an elongated body of light-transmitting material having a plurality of depressions adjacent one end thereof, a plurality of ornamental light-transmitting elements having extended means entering said depressions to removably support the elements on the body with said elements contacting the body so that light may pass directly thereto, and a light source at the other end of said body adapted to project light into the other end of said body.

STANLEY IWANOWICZ.